US011816802B2

(12) United States Patent
Chiche et al.

(10) Patent No.: US 11,816,802 B2
(45) Date of Patent: Nov. 14, 2023

(54) METHOD FOR CONFIGURING AND DISPLAYING, IN AUGMENTED OR MIXED OR EXTENDED REALITY, THE INFORMATION RELATING TO EQUIPMENT INSTALLED IN A REAL SITE, AND ASSOCIATED COMPUTER PROGRAM PRODUCT AND ELECTRONIC DEVICE

(71) Applicant: Schneider Electric Industries SAS, Rueil Malmaison (FR)

(72) Inventors: Thierry Chiche, Saint Ismier (FR); Romain Gassion, Izeaux (FR); Tewfik Meftah, Grenoble (FR); Yannick Neyret, Biviers (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 0 days.

(21) Appl. No.: 17/548,661

(22) Filed: Dec. 13, 2021

(65) Prior Publication Data

US 2022/0189125 A1 Jun. 16, 2022

(30) Foreign Application Priority Data

Dec. 16, 2020 (FR) .................................. FR2013372

(51) Int. Cl.
*G06T 19/00* (2011.01)
*G06V 20/20* (2022.01)
(Continued)

(52) U.S. Cl.
CPC ...... *G06T 19/006* (2013.01); *G06K 19/06028* (2013.01); *G06K 19/06037* (2013.01);
(Continued)

(58) Field of Classification Search
CPC .................. G06Q 10/20; G06T 19/006; G06T 2207/30204; G06T 11/00; G06T 11/60;
(Continued)

(56) References Cited

U.S. PATENT DOCUMENTS

2019/0236844 A1* 8/2019 Balasian ............... G06F 3/0304
2019/0377330 A1* 12/2019 Shors ................... G06V 30/224
(Continued)

FOREIGN PATENT DOCUMENTS

CN 111062504 A * 4/2020 ......... G02B 27/0172
EP 3159813 A1 4/2017
(Continued)

OTHER PUBLICATIONS

Engelke, Timo et al., "Content First—A concept for Industrial Augmented Reality Maintenance Applications using Mobile Devices", Proceedings of the 6th ACM Multimedia Systems Conference, Mar. 18, 2015, pp. 105-111.

(Continued)

*Primary Examiner* — Chante E Harrison
(74) *Attorney, Agent, or Firm* — Locke Lord LLP (57) ABSTRACT

A method for configuring and displaying, in augmented or mixed or extended reality, the information relating to equipment installed in a real site, including:
constructing a database in which each document or each selected part of a document is associated with a corresponding electronic tag that contains an address which leads to the document or to the selected part of the document associated therewith;
unequivocally identifying the equipment installed in the real site;
associating the identified equipment with an electronic tag;
(Continued)

creating one or more first points of interest linked to at least one electronic tag and configured to be superposed on a first document or on a first selected part of a corresponding document;

creating one or more second points of interest to be displayed in a manner superposed on the equipment; and associating a second point of interest with at least one first point of interest.

18 Claims, 4 Drawing Sheets

(51) Int. Cl.
  *G06V 30/10* (2022.01)
  *G06K 19/06* (2006.01)
  *G06K 19/07* (2006.01)

(52) U.S. Cl.
  CPC ......... *G06K 19/0723* (2013.01); *G06V 20/20* (2022.01); *G06V 30/10* (2022.01)

(58) Field of Classification Search
  CPC ................ G06T 7/73; G06T 2219/004; G06T 2354/00; G06K 19/06028; G06K 19/06037; G06K 19/0723; G06V 20/20; G06V 30/10; G05B 2219/35494; G06F 16/11
  See application file for complete search history.

(56) References Cited

U.S. PATENT DOCUMENTS

2020/0094992 A1* 3/2020 Hoover .................. G06V 20/20
2020/0253079 A1* 8/2020 Lairsey ................ H05K 7/1494

FOREIGN PATENT DOCUMENTS

| EP | 3822743 A1 * | 5/2021 | ......... G05B 19/0425 |
| FR | 2990286 A1 | 11/2013 | |
| TW | 202030653 A * | 8/2020 | ........... G06T 19/006 |

OTHER PUBLICATIONS

Zhu J. et al., "An authorable context-aware augmented reality system to assist the maintenance technicians", International Journal of Advanced Manufacturing Technology, 2013, pp. 1699-1714.

Wang Junfeng et al., "An Augmented Reality Based System for Remote Collaborative Maintenance Instruction of Complex Products", 2014 IEEE International Conference on Automation Science and Engineering (CASE), Aug. 18, 2014, pp. 309-314.

French Search Report and Written Opinion dated Aug. 19, 2021 for corresponding French Patent Application No. FR2013372, 7 pages.

* cited by examiner

METHOD FOR CONFIGURING AND DISPLAYING, IN AUGMENTED OR MIXED OR EXTENDED REALITY, THE INFORMATION RELATING TO EQUIPMENT INSTALLED IN A REAL SITE, AND ASSOCIATED COMPUTER PROGRAM PRODUCT AND ELECTRONIC DEVICE

TECHNICAL FIELD

The present invention relates to a method for configuring and displaying, in augmented or mixed or extended reality, the information relating to equipment installed in a real site, and to an associated computer program product and electronic device.

The method, the computer program product and the electronic device according to the present invention will be described here making specific reference to augmented reality or AR. However, this reference should not be considered as limiting the possibility of applying the method, the computer program product and the electronic device according to the invention to other types of immersive reality, in particular to mixed reality (or MR) and to extended reality (or XR).

BACKGROUND

Augmented reality is nowadays widely used in many technical fields, for example to facilitate the diagnostics and maintenance of industrial machines.

In particular, configuring an industrial machine in augmented reality makes it possible to display, on the screen of a portable electronic device, an enriched image of the machine with associated information relating to the same machine.

The information may be accessed by way of one or more points of interest (or POI) that are preconfigured so as to be linked directly to the relevant information and, during the triggering of an AR application, they are superposed on the image of the equipment displayed on the screen of the portable electronic device.

Operators who have to intervene on installed equipment therefore have available to them, everywhere, the necessary information specific to the equipment, such as for example wiring diagrams, intervention manuals, videos, tutorials, et cetera.

The parts of the equipment on which it is necessary to intervene are therefore identified more accurately and more quickly, and the times dedicated to the intervention, to searching for documents and to maintenance are reduced, and human errors are decreased.

However, even though using augmented reality offers multiple advantages, there are still some aspects that need to be improved.

In particular, when configuring an AR application on a technical device, it is nowadays necessary to manually define each point of interest and its specific information, such as for example the links to the technical documentation, the links to the technical diagrams, the links to the user guide, the links to the list of frequently asked questions or FAQs, the link to the website of the manufacturer, et cetera.

This is therefore a highly lengthy process that requires multiple steps to be carried out, such as for example listing all of the documentation links to the equipment, manually reading and indexing the identified/referenced relevant parts of the equipment in the document, and manually creating each POI with direct links to the corresponding documentation.

Furthermore, when a preconfigured POI is selected, access to the linked information may be inaccurate because the associated link opens the document on the first page and not at the exact location of the document where the relevant information is found.

A user therefore has to start his own search to find the necessary technical information, which may be difficult, cause errors and take a lot of time.

Lastly, there is also the possibility of the AR data being incoherent when modifications have been made to certain documents, and in particular in technical diagrams.

SUMMARY

The aim of the invention is to provide a solution that at least partially addresses these problems, and in particular a solution that makes it possible to identify relevant information more easily and more quickly in comparison with the known solutions.

This aim is achieved by a method for configuring and displaying, in augmented or mixed or extended reality, the information relating to at least one equipment installed in a real site, the method being characterized in that it comprises at least the following steps:
- (a): constructing a database comprising a plurality of documents that contain information relating to the equipment, in which each document or each selected part of a document contained in the database is associated with at least one corresponding electronic tag that contains an address which leads to the document or to the selected part of the document associated therewith;
- (b): unequivocally identifying the equipment installed in the real site;
- (c): associating the equipment thus identified with at least one electronic tag associated with a document or with a selected part of a document;
- (d): creating one or more first points of interest linked to at least one electronic tag, each first point of interest being configured to be superposed on a first document or on a first selected part of a corresponding document;
- (e): creating one or more second points of interest to be displayed in a manner superposed directly on the equipment installed in the real site; and
- (f): associating a second point of interest with at least one first point of interest.

According to other advantageous aspects of the invention, such a method may comprise one or more of the following features, taken alone or in any technically permissible combination:
- a subsequent step (g) of associating at least one first point of interest with one or more additional first points of interest, each additional first point of interest being linked to and configured to be superposed on a second document different from the first document or on a second part of the first document different from the first part;
- step (g) of associating at least one first point of interest with one or more additional first points of interest comprises automatically associating, by way of a first software module, each selected first point of interest with one or more additional first points of interest;

step (g) of associating at least one first point of interest with one or more additional first points of interest comprises the following substeps:

(g.1): generating a list of the created first points of interest;

(g.2): selecting, from the generated list, a first point of interest and manually associating therewith one or more additional first points of interest;

step (b) of unequivocally identifying the equipment installed in the real site comprises detecting at least one marker affixed to the equipment, the marker unequivocally identifying the equipment to which it is affixed;

a step (h) of saving the results obtained at least at the end of the step of associating a second point of interest with at least one first point of interest;

a step (j) of displaying, on a screen of an electronic device used by an operator intervening on the real site where the equipment is installed, at least one first document or a selected first part of a first document;

a step (k) of manually selecting, on the screen, a first point of interest superposed on the first document or on the selected first part of the first document;

a step (l) of directly projecting, onto the equipment, by way of the electronic device, at least one second point of interest that is linked unequivocally to the selected first point of interest;

a step (m) of projecting, onto a surface of the real site, an augmented-reality three-dimensional image of the first document or of the selected first part of the first document displayed on the screen of the electronic device;

step (a) of constructing a database comprises at least the following substep:

(a.1): selecting, for each document or each selected part of a document, an identification element affixed to this document, which unequivocally identifies the corresponding document or the corresponding selected part of the document;

substep (a.1) of selecting an identification element for each document or each selected part of a document comprises automatically analysing each document or each selected part of a document by way of a deep-learning or machine-learning artificial intelligence software module;

during step (b), detecting at least one marker affixed to the equipment comprises identifying at least one image by way of an optical image-recognition system;

during step (b), detecting at least one marker affixed to the equipment comprises identifying at least one text inscription using an optical character-recognition system;

step (c) of associating the identified equipment with at least one electronic tag comprises automatically associating the equipment with one or more electronic tags by way of a software module installed in an electronic device;

step (c) of associating the identified equipment with at least one electronic tag comprises manually associating the equipment with one or more electronic tags;

the marker affixed to the equipment includes coordinates indicating the installation position of the equipment in the real site, the marker being an element selected from among the group comprising a QR code, an RFID tag and a barcode.

The abovementioned aim of the present invention is furthermore also achieved by a computer program product comprising software instructions that, when they are implemented by an information processing unit integrated into an electronic device, implement a method for configuring and displaying, in augmented or mixed or extended reality, the information relating to at least one equipment installed in a real site, as mentioned above.

The abovementioned aim of the present invention is furthermore also achieved by an electronic device, characterized in that it is configured to implement a method for configuring and displaying, in augmented or mixed or extended reality, the information relating to at least one equipment installed in a real site, as mentioned above.

BRIEF DESCRIPTION OF THE DRAWINGS

Other aspects and advantages of the invention will become apparent on reading the following description, given solely by way of example and with reference to the appended drawings, in which.

DETAILED DESCRIPTION

It should be noted that, in the following detailed description, components that are identical or similar from a structural and/or functional viewpoint bear the same reference numerals, whether or not they are shown in different embodiments of the present description.

It should also be noted that, in order to describe the present invention clearly and concisely, the drawings are not necessarily to scale and some features may be shown in a schematic form.

Furthermore, when the term "adapted" or "arranged" or "configured" or similar terms are used here with reference to any component in its entirety, or to any part of a component, or to a combination of components, it should be understood that this means and encompasses the structure and/or the configuration and/or the form and/or the positioning of the component or of the part that this term denotes.

In particular, with respect to electronic and/or software means/modules, each of the terms indicated above encompasses electronic circuits as well as software codes and/or algorithms or complete programs stored or being executed.

Figure 1:
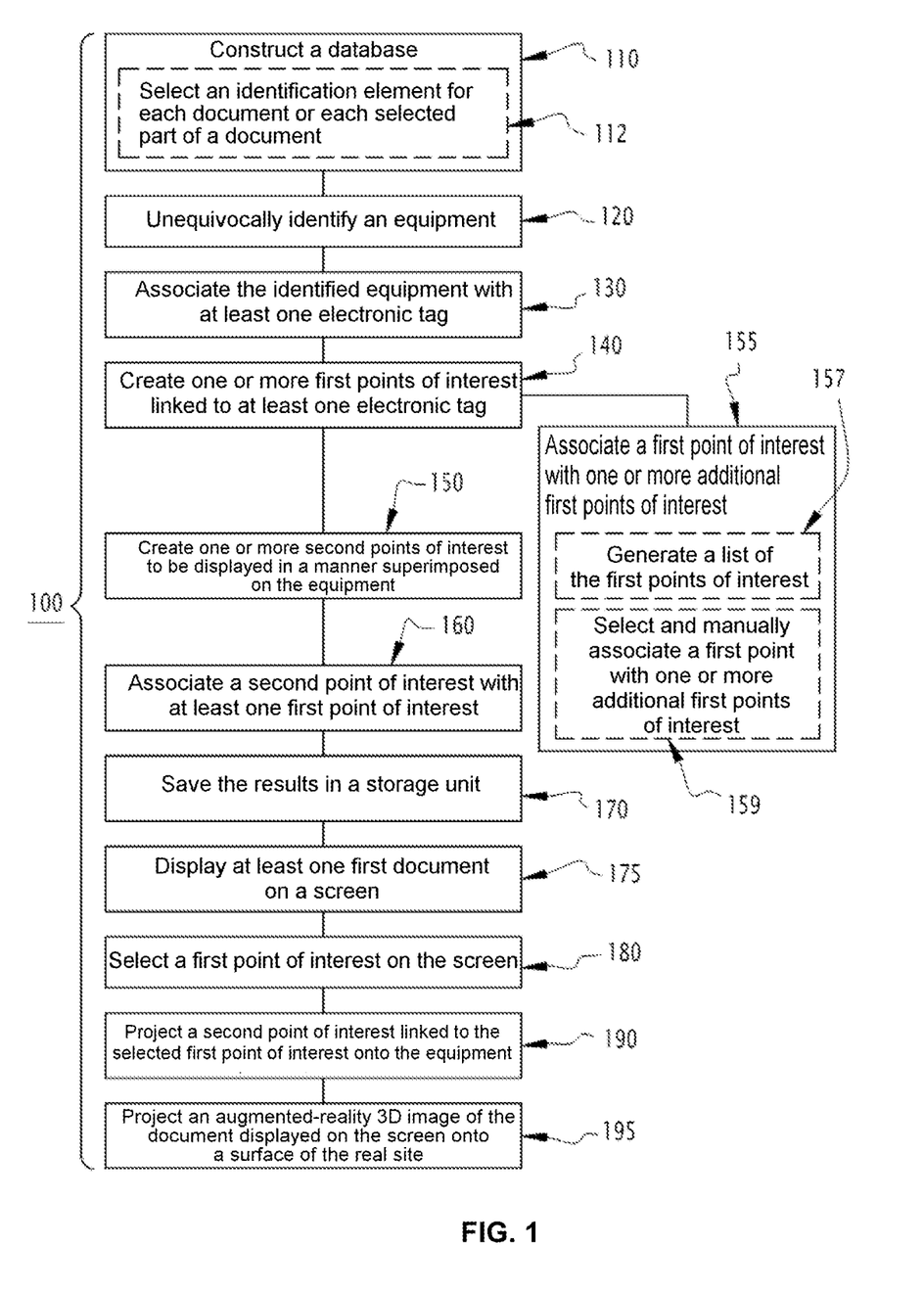
FIG. 1 is a flowchart schematically illustrating a configuration method according to the invention.
Figure 2:
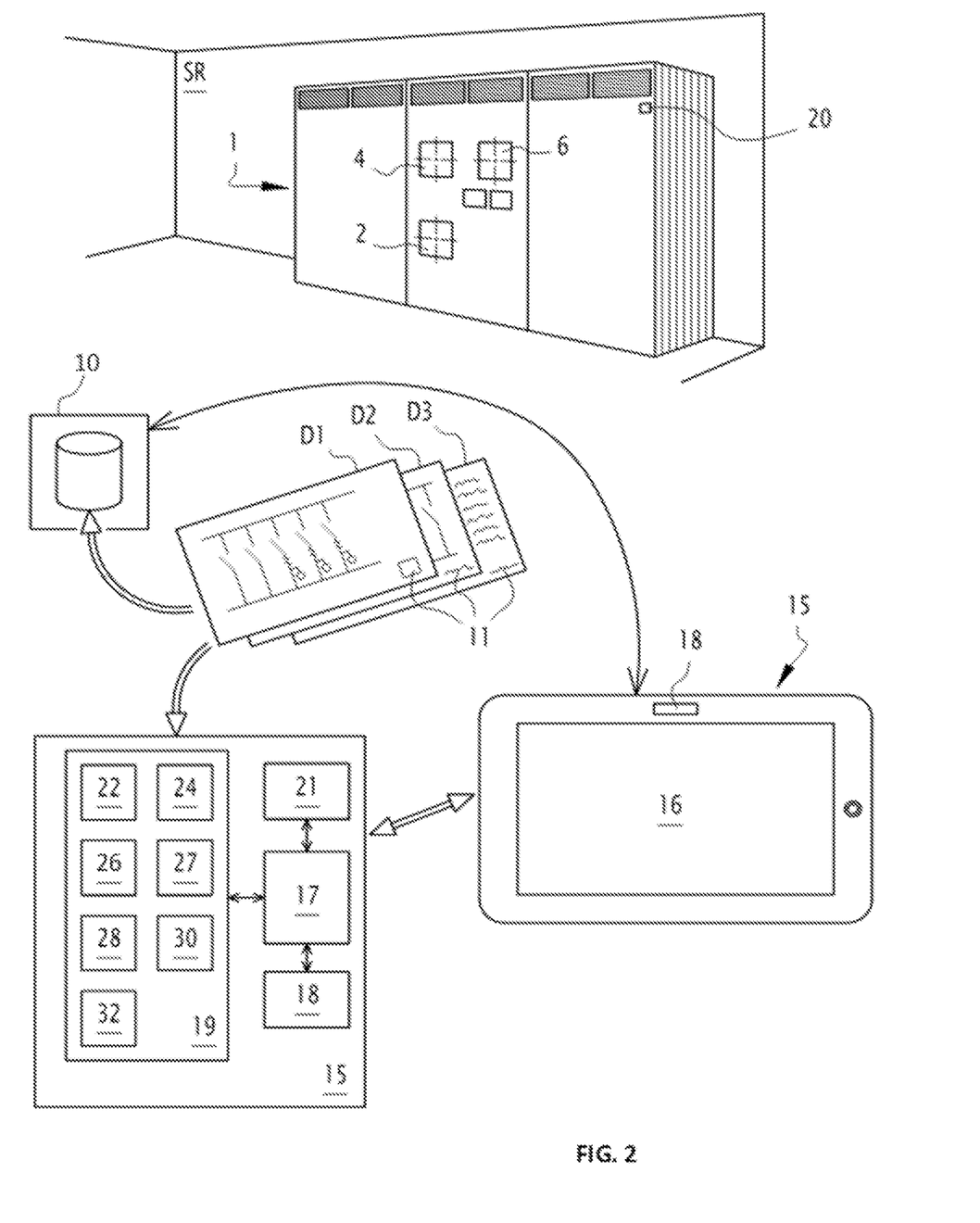
FIG. 2 is a schematic depiction of an equipment, in this case an electrical enclosure, installed in a real site with electronic devices that are used according to the invention.

FIG. 1 is a flowchart schematically illustrating a method 100 for configuring and displaying, in augmented or mixed or extended reality, the information relating to at least one equipment, indicated in FIG. 2 with the reference numeral 1.

In particular, in the example illustrated in FIG. 2, the equipment installed in the real site SR is an electrical enclosure 1 comprising a plurality of parts or components arranged in the enclosure 1, such as for example a plurality of electrical units 2, 4 and 6, such as circuit breakers.

In any case, the term equipment should not be considered to be limiting, and the equipment 1 may be any device considered on its own or any machine considered on its own or a set of devices, machines or components.

As illustrated in FIG. 1, the method 100 according to the invention comprises a first step 110 of constructing a database, indicated in FIG. 2 by the reference numeral 10, this database 10 comprising a plurality of documents D1, D2, D3 . . . that contain information relating to the equipment 1.

In particular, each document or each selected part of a document contained in the database 10 is associated, preferably unequivocally, with a corresponding electronic tag, while each electronic tag contains an address leading to the information contained in the document or in the selected part of the document associated therewith.

Therefore, even if the relevant document is a document comprising multiple pages, the electronic tags are addressed directly to the corresponding relevant part of this document, and not just to the start of a document.

This association may be performed for example by way of a first software module installed on an electronic device.

Preferably, such an electronic device is a portable electronic device or terminal configured for augmented-reality gaming, such as a mobile telephone, for example a multifunction telephone (or smartphone), in other words a "pocket terminal", an electronic tablet (or pad), or a similar device.

In the example illustrated in FIG. 2, the electronic device is shown schematically in the form of an electronic tablet 15 and comprises a screen 16, an information processing unit 17, a camera and/or video recorder 18 for capturing images and/or filming the objects located in the real world and displaying the corresponding images on screen 16, at least one data storage unit 19, and communication means 21 for external communication, for example wireless ones. In FIG. 2, the electronic tablet is shown twice, in order to show its structure seen from the outside on the right and its internal components on the left. The double-headed arrow between these two depictions indicates the fact that this is the same object, shown in two ways.

According to the example illustrated in FIG. 2, the first software module, indicated schematically with the reference numeral 22, is installed in the electronic device 15 and contains software instructions intended to be executed by the information processing unit 17.

According to one possible embodiment, the documents D1, D2, D3 . . . selected to be contained in the database 10 comprise for example at least a plurality of wiring diagrams and/or mechanical diagrams and/or communication diagrams relating to the equipment 1 or to one or more of its components, such as for example the electrical units 2, 4 and 6.

In all cases, the term "document" should be interpreted here in the broadest sense, and may therefore be considered to include physical documents and digital documents containing text, graphical, audio and video data.

In particular, as will be able to be easily understood by a person skilled in the art, depending on the specific application, these documents D1, D2, D3 may be of any possible type and may contain information that is also of any possible type, for example a user manual, an instruction manual, an archive containing data relating to the equipment and/or to its components, such as for example a circuit diagram showing the installation and the way in which the equipments or the components of an equipment are connected to one another, a list of FAQs, a video sequence, an overview of a supervision screen, et cetera.

According to one possible embodiment, step 110 of constructing a database 10 comprises at least substep 112 of selecting, for each document or each selected part of a document, an identification element affixed to this document.

Each identification element, indicated schematically in FIG. 1 with the same reference numeral 11 for all of documents D1, D2 and D3 that are shown, unequivocally identifies the corresponding document or the corresponding selected part of the document.

In particular, substep 112 comprises automatically analysing each document or each selected part of a document by way of the first software module 22, or of another module configured for this purpose, in particular a deep learning or machine learning artificial intelligence software module.

The identification element 11 may for example be a code, such as a matrix code or QR code, an RFID tag, a barcode, a text, an alphanumeric combination, a technical and/or graphical symbol, an icon, an image, an electronic tag, a geographical position, such as for example GPS coordinates, a position indicated in XYZ coordinates in an identified reference frame, a form recognized by an artificial intelligence algorithm, et cetera.

The identification element 11 may furthermore be an element already affixed to each document D1, D2, D3 or relevant part of the document, or it may be affixed expressly during the execution of the method 100 according to the invention.

Furthermore, according to one possible embodiment, the database 10 used in the method 100 may be a database that already exists, at least in part, for needs other than AR, and the same identifier may be used in multiple views, for example electrical or mechanical or 3D views, et cetera.

The method 100 according to the invention furthermore comprises a second step 120 of unequivocally identifying the equipment 1 installed in the real site SR.

According to one possible embodiment, step 120 of unequivocally identifying the equipment 1 installed in the real site SR comprises
    detecting at least one marker, referenced in FIG. 2 with the reference numeral 20, which is affixed to the equipment 1 and which makes it possible to unequivocally identify the equipment 1 to which it is affixed.

According to one possible embodiment, the marker 20 affixed to the equipment 1 includes coordinates indicating the position where the equipment 1 is installed in the real site SR.

This marker 20 is for example a marker selected from among the group comprising a matrix code or QR code, an RFID tag, a barcode, a text, an alphanumeric combination, a technical and/or graphical symbol, an icon, an image, an electronic tag, a geographical position, such as for example GPS coordinates, a position indicated in XYZ coordinates in an identified reference frame, a form recognized by an artificial intelligence algorithm, et cetera.

The second step 120 may be performed in any sequence with respect to the first step 110, and the two steps 110 and 120 may be performed at the same time or at different times.

According to one possible embodiment, step 120 comprises identifying one or more images affixed to the equipment 1 by way of an optical image-recognition system. These images also form markers 20 of the equipment 1.

According to another possible embodiment, this step 120 comprises identifying one or more text inscriptions affixed to the equipment 1 using an optical character-recognition or OCR system. These text inscriptions also form markers 20 of the equipment 1.

For example, the optical image-recognition system and/or the optical character-recognition system may be installed on the electronic device 15, as shown in FIG. 2, in which they are indicated with the reference numerals 24 and 26, respectively.

Clearly, it is possible to use both systems 24 and 26 in combination, and/or to use other identification systems or methods, such as for example geolocation systems, 3D identification systems, et cetera.

The method 100 according to the invention furthermore comprises at least one third step 130 of associating the equipment 1 thus identified by way of the marker 20 during the second step 120 with at least one of the electronic tags that were associated unequivocally, during step 110, with a document D1, D2, D3 or with a selected part of a document.

According to one possible embodiment, step 130 comprises automatically associating the equipment 1 with one or more electronic tags by way of a second software module including software instructions specifically configured for this purpose.

This second software module is for example also installed in the electronic device 15, as illustrated in FIG. 2, where it is referenced with the reference numeral 28.

According to another possible embodiment, step 130 of associating the identified equipment 1 with at least one electronic tag comprises manually associating the equipment 1 with one or more of the electronic tags.

This manual association may be performed directly on the screen 16 using the software module 28 or using another software module specifically configured for this purpose.

The method 100 according to the invention furthermore comprises at least:
- a fourth step 140 of creating one or more first points of interest P1, in which each first point of interest P1 is linked to at least one electronic tag and is configured to be superposed on a corresponding first document D1, or D2 or D3, or on a corresponding selected first part of a document with which the electronic tag is associated;
- a fifth step 150 of creating one or more second points of interest P2 intended to be displayed and superposed, in augmented reality, directly on the equipment 1 installed in the real site SR, for example during an intervention by an operator on the site SR, who triggers an AR application in order to access the information relating to the equipment 1; and
- a sixth step 160 of bidirectionally associating each second point of interest P2 with at least one first point of interest P1.

The first and second points of interest P1 and P2 are in practice graphical interface components, that is to say "widget" components, and may take the form of a text, data, a symbol, an icon, or a contextual menu, et cetera.

The fourth step 140, the fifth step 150 and the sixth step 160 are performed for example by way of a third software module including software instructions for this purpose, and which is installed for example on the same electronic device 15 as shown in the example of FIG. 2, in which the third software module is referenced with the reference numeral 30.

In practice, during the execution of steps 140 and 150, the third software module 30 defines at least the graphical form of each point of interest, the links to the tags and, where applicable, the links to other points of interest.

The fourth step 140 may be performed in any sequence with respect to the fifth step 150, and the two steps 140 and 150 may be performed at the same time or at different times.

According to one possible embodiment, the method 100 furthermore comprises a step 155 of associating at least one first point of interest P1 with one or more additional first points of interest P1', each additional first point of interest P1' being linked to and configured to be superposed on a second document different from the first document or on a second part of the first document different from the first part.

A ramified link between points of interest P1 is thereby advantageously created. Thus, when an operator selects a first point of interest P1 and accesses the information contained in the document or in a selected part of this document associated therewith, if this information is linked to other information contained in another document and that has to be consulted, the operator is guided accurately to this other information and is able to access it quickly and directly.

According to one possible embodiment, the ramified information may be organized according to hierarchical/priority criteria that make it possible to find the most relevant information more quickly. For example, the ramifications may be organized and accessed depending on the type and the content of the information contained, for example electrical, mechanical, electronic, hardware and/or software, and/or depending on the identification of the users or their profiles.

According to one possible embodiment, step 155 comprises automatically associating each selected first point of interest P1 with one or more additional first points of interest P1'.

The automatic association may be carried out by the third software module 30 or by way of an additional software module specifically configured for this purpose and installed for example on the electronic device 15.

As a variant, step 155 comprises the following substeps:
- 157: generating a list of the created first points of interest P1;
- 159: selecting a first point of interest P1 from the generated list and manually associating therewith one or more additional first points of interest P1'.

For example, the generated list may be displayed on the screen 16 of the electronic device 15, and an operator may first of all carry out the selection and then the desired association, using the software module 30 or using a software module specifically configured for this purpose.

This selection may be repeated multiple times for each listed first point of interest P1.

The method 100 according to the invention comprises at least one step 170 of saving the results obtained at least at the end of the sixth step 160.

According to some possible embodiments, it is also possible to save the results obtained during the execution of one or more of the steps described above.

Specifically, it is possible to save the partial results obtained during the execution and/or at the end of the first step 110, and/or of the second step 120, and/or of the third step 130, and/or of the fourth step 140, and/or of the fifth step 150, and/or of the sixth step 160, before saving the results ultimately obtained at the end of the sixth step 160.

Figure 3:
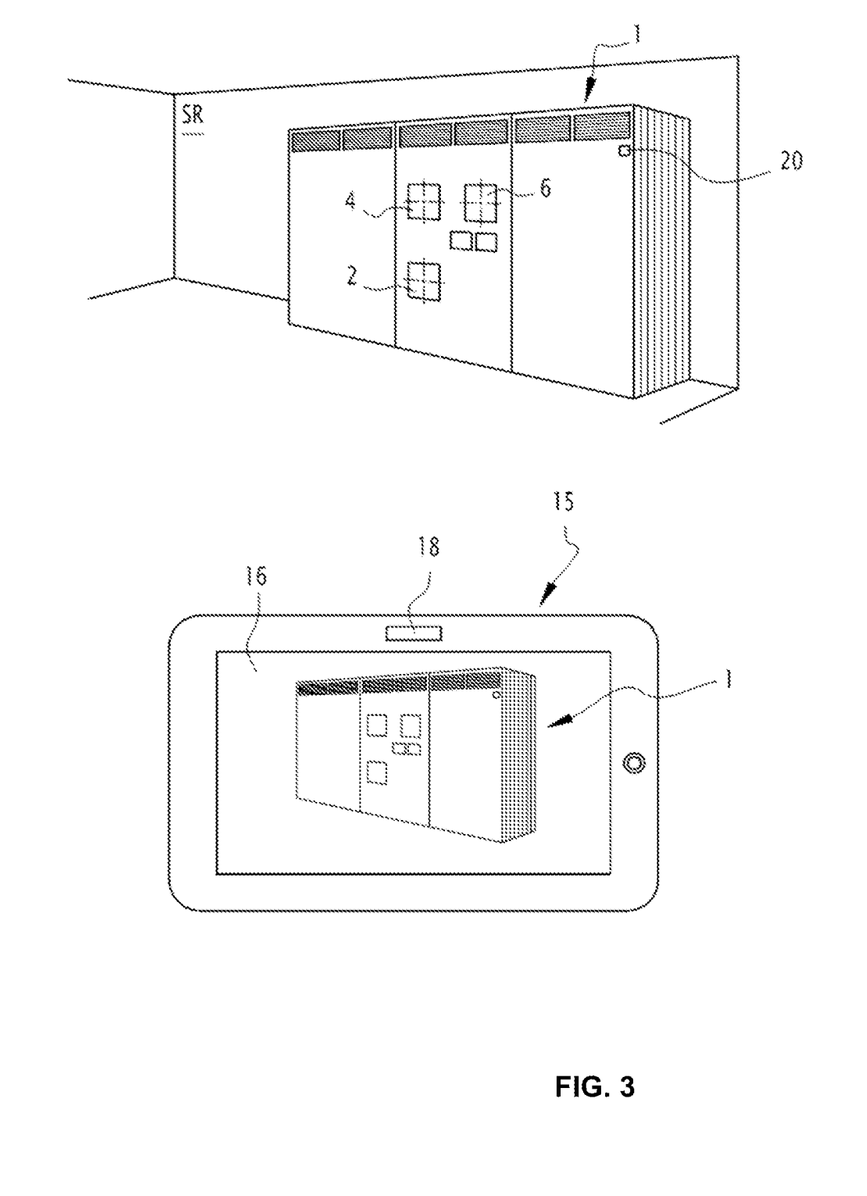
FIG. 3 is a view showing an image of the equipment displayed on the screen of an electronic device when implementing the method according to the invention.

The partial and/or definitive results may be saved in the data storage unit 19 and/or in an augmented reality server shown in FIG. 2 and indicated with the reference numeral 25. This augmented reality server contains the database 10. According to one possible embodiment of the method 100, when an operator intervenes on the real site SR where the equipment 1 is installed, as shown in FIG. 3, he may focus on or film the equipment 1, for example using the camera and/or video recorder 18 integrated into the electronic device 15, and he may trigger, on this device 15, an AR application 27 in order to view the information relating to this equipment 1 in augmented reality.

To this end, if they are stored for example in the server 25, the results relating to the configuration executed for the equipment 1 in steps 100 to 160 may be requested by the communication means 21 and downloaded for display on the screen 16.

As an alternative, if the results of the configuration are stored in the storage unit 19, they may be directly loaded within the electronic device 15.

Next, the method 100 according to the invention comprises the following steps:

175: displaying, on the screen 16 of the electronic device 15 used by the operator intervening on the real site SR, at least one first document, or a selected first part of a first document, for example the document D1;

180: manually selecting, on the screen 16, a first point of interest P1 superposed on the first document D1 or on the selected first part of the first document;

190: by way of the electronic device 15, projecting, directly onto the equipment 1, at least one second point of interest P2 that is associated with the selected first point of interest P1.

Figure 4:
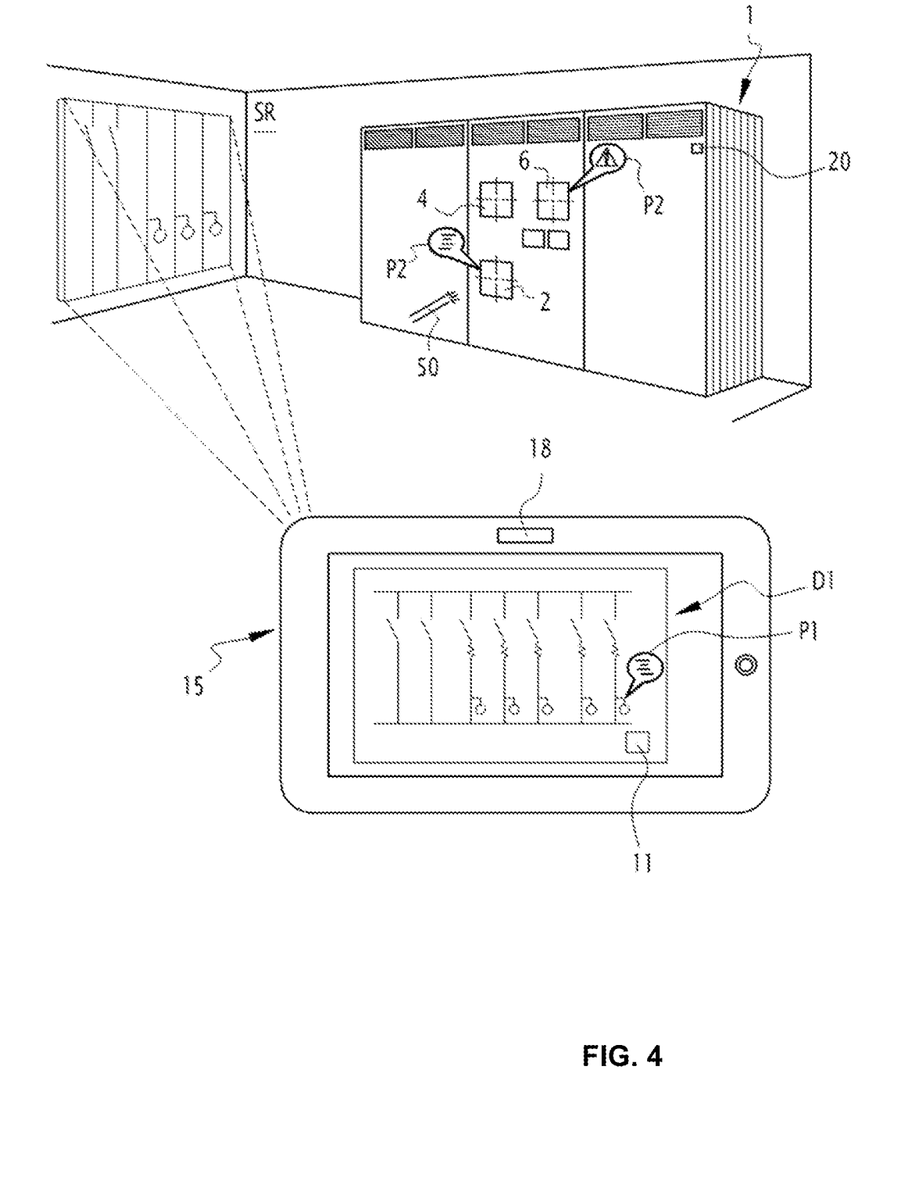
FIG. 4 is a view showing the whole of the equipment installed in the real site with a document displayed on the screen of an electronic device and an enriched augmented-reality image projected onto a wall of the installation site when implementing the method according to the invention.

As shown in FIG. 4, at least one second point of interest P2 is thereby displayed and superposed directly on the enclosure 1, for example at the circuit breaker 2, while the associated first point of interest P1 is superposed on the document D1 displayed on the screen 16, the document D1 containing relevant information relating to the circuit breaker 2.

Furthermore, in the method 100 according to the invention, the bidirectional link created between these two points of interest P1 and P2 is visually highlighted, as illustrated in FIG. 4, by displaying a virtual pointer 50 in front of the equipment 1.

In the example illustrated in FIG. 4, another second point of interest P2 is illustrated and displayed on the enclosure 1, for example corresponding to the circuit breaker 6.

If the operator touches this other second point of interest P2, and if this other second point of interest P2 had been linked, during step 160, to a first point of interest P1 other than the one displayed on the document D1, by virtue of the link established during step 160, this different first point of interest P1 is displayed on the screen 16.

This different point of interest P1 may be associated with relevant information for the circuit breaker 6 that is contained in the same document D1, already displayed on the screen, or in another document and, in the latter case, this other document is also displayed on the screen 16.

According to one possible embodiment, if a plurality of points of interest are linked to one another, these points of interest may be specifically filtered or prioritized depending for example on the context and/or the profile of the user.

According to one possible embodiment, the method 100 furthermore comprises a step 195 of projecting, onto a surface of the real site SR, for example a wall, an augmented-reality 3D image, shown schematically in FIG. 4 with the reference numeral 60. The image 60 corresponds to the document or to the selected part of a document displayed on the screen 16 of the electronic device 15.

The augmented-reality 3D images of the documents stored in the database 10 may be generated by way of another software module configured, for this purpose, with software instructions.

This other software module may be installed in the electronic device 15 and is indicated schematically with the reference numeral 32 in the example of FIG. 2.

It is clearly apparent from the above description that the method 100, along with the corresponding computer program product and electronic device 15, make it possible to achieve the underlying aim of the present invention.

Specifically, according to the invention, an operator is always directed quickly and directly to the document or to the specific part of the document containing the relevant information, and not just to the start of a document.

Furthermore, the information is interlinked with a ramification that guides an operator from one document or from one part of a document to another part of the same document or to another document without any effort.

The points of interest that make it possible to access the information are displayed very clearly on the screen of the electronic device, and also directly on the equipment, and operational links are created between points of interest, such that possibilities for errors are minimized.

These results are obtained with a solution that is relatively easy to implement and highly flexible to apply.

The method 100, the computer program product and the electronic device 15 designed in this way are able to be modified and varied. For example, the electronic device that is used may be a headset commonly used for augmented-reality gaming that is equipped with the screen 16, or glasses in which each lens forms or is replaced by a screen. If it is used, the augmented reality server 25 may be installed remotely or in the electronic device 15. The software modules with their corresponding software instructions may be stored in the electronic device 15 or distributed among storage units that are separate and remote from one another.

All of the configurations may furthermore be replaced with technically equivalent elements.

The invention claimed is:

1. A method for configuring and displaying, in augmented or mixed or extended reality, information relating to at least one equipment installed in a real site, the method comprising at least:

constructing a database comprising a plurality of documents that contain information relating to the equipment, in which each document or each selected part of a document contained in the database is associated with at least one corresponding electronic tag that contains an address which leads to the document or to the selected part of the document associated with the at least one corresponding electronic tag;

unequivocally identifying the equipment installed in the real site;

associating the identified equipment with at least one electronic tag associated with a document of the plurality of documents or with a selected part of a document of the plurality of documents;

creating one or more first points of interest linked to at least one electronic tag associated with a first document of the plurality of documents or with a first selected part of the first document, each first point of interest being configured to be displayed in a manner superposed on the first document, or on the first selected part of the first document, when the first document or the first selected part of the first document is displayed on a screen of an electronic device;

creating one or more second points of interest to be displayed in a manner superposed directly on the equipment installed in the real site; and associating a second point of interest of the created one or more second points of interest with at least one first point of interest of the created one or more first points of interest.

2. The method according to claim 1, further comprising:
associating at least one first point of interest with one or more additional first points of interest, each additional first point of interest being linked to and configured to be superposed on a second document different from the first document or on a second part of the first document different from the first part.

3. The method according to claim 2, wherein associating at least one first point of interest with one or more additional first points of interest comprises automatically associating, by way of a first software module, each selected first point of interest with one or more additional first points of interest.

4. The method according to claim 2, wherein associating at least one first point of interest with one or more additional first points of interest comprises:
generating a list of the created first points of interest;
selecting, from the generated list, a first point of interest and manually associating therewith one or more additional first points of interest.

5. The method according to claim 1, wherein unequivocally identifying the equipment installed in the real site comprises detecting at least one marker affixed to the equipment, the marker unequivocally identifying the equipment to which it is affixed.

6. The method according to claim 5, wherein detecting at least one marker affixed to the equipment comprises identifying at least one image by way of an optical image-recognition system.

7. The method according to claim 5, wherein detecting at least one marker affixed to the equipment comprises identifying at least one text inscription using an optical character-recognition system.

8. The method according to claim 5, wherein the marker affixed to the equipment includes coordinates indicating the installation position of the equipment in the real site, the marker being an element selected from among the group comprising a QR code, an RFID tag and a barcode.

9. The method according to claim 1, further comprising at least saving the results obtained at least at the end of the associating a second point of interest with at least one first point of interest.

10. The method according to claim 9, further comprising projecting, onto a surface of the real site, an augmented-reality three-dimensional image of the first document or of the selected first part of the first document displayed on the screen of the electronic device.

11. The method according to claim 1, further comprising:
displaying, on a screen of an electronic device used by an operator intervening on the real site where the equipment is installed, at least one first document or a selected first part of a first document;
manually selecting, on the screen, a first point of interest superposed on the first document or on the selected first part of the first document;
by way of the electronic device, projecting, directly onto the equipment, at least one second point of interest that is linked unequivocally to the selected first point of interest.

12. The method according to claim 1, wherein constructing a database comprises at least:
selecting, for each document or each selected part of a document, an identification element affixed to this document, which unequivocally identifies the corresponding document or the corresponding selected part of the document.

13. The method according to claim 12, wherein selecting an identification element for each document or each selected part of a document comprises automatically analysing each document or each selected part of a document by way of a deep-learning or machine-learning artificial intelligence software module.

14. The method according to claim 1, wherein associating the identified equipment with at least one electronic tag comprises automatically associating the equipment with one or more electronic tags by way of a software module installed in an electronic device.

15. The method according to claim 1, wherein associating the identified equipment with at least one electronic tag comprises manually associating the equipment with one or more electronic tags.

16. The method according to claim 1, further comprising visually highlighting the association of the second point of interest with the at least one first point of interest by displaying a virtual pointer superposed on the equipment.

17. A computer program product comprising a non-transitory computer readable medium having software instructions stored thereon that, when executed by an information processing unit, cause an electronic device to implement the method according to claim 1.

18. An electronic device configured to implement the method according to claim 1.

* * * * *